United States Patent
Kashitani

(10) Patent No.: US 11,031,592 B2
(45) Date of Patent: Jun. 8, 2021

(54) LITHIUM DOPED SILICON OXIDE-BASED NEGATIVE ELECTRODE MATERIAL AND METHOD OF MANUFACTURING THE SAME

(71) Applicant: OSAKA TITANIUM TECHNOLOGIES CO., LTD., Hyogo (JP)

(72) Inventor: Yusuke Kashitani, Amagasaki (JP)

(73) Assignee: OSAKA TITANIUM TECHNOLOGIES CO., LTD., Hygo (JP)

( * ) Notice: Subject to any disclaimer, the term of this patent is extended or adjusted under 35 U.S.C. 154(b) by 91 days.

(21) Appl. No.: 16/327,954

(22) PCT Filed: Sep. 28, 2017

(86) PCT No.: PCT/JP2017/035283
§ 371 (c)(1),
(2) Date: Feb. 25, 2019

(87) PCT Pub. No.: WO2018/074175
PCT Pub. Date: Apr. 26, 2018

(65) Prior Publication Data
US 2019/0190023 A1    Jun. 20, 2019

(30) Foreign Application Priority Data
Oct. 19, 2016 (JP) .............................. JP2016-205040

(51) Int. Cl.
*H01M 4/485* (2010.01)
*H01M 10/0525* (2010.01)
(Continued)

(52) U.S. Cl.
CPC .......... *H01M 4/485* (2013.01); *C01B 33/113* (2013.01); *H01M 4/36* (2013.01); *H01M 4/38* (2013.01);
(Continued)

(58) Field of Classification Search
CPC .......... H01M 4/485; H01M 4/36; H01M 4/38; H01M 10/0525; C01B 33/133
(Continued)

(56) References Cited

U.S. PATENT DOCUMENTS

| | | | | |
|---|---|---|---|---|
| 2003/0053945 A1* | 3/2003 | Fukuoka | ............... | H01M 4/131 423/332 |
| 2007/0122700 A1* | 5/2007 | Miyachi | .................. | H01M 4/13 429/218.1 |
| 2017/0207450 A1* | 7/2017 | Takahashi | ........... | H01M 4/1391 |

FOREIGN PATENT DOCUMENTS

| | | |
|---|---|---|
| CN | 108321362 A * | 7/2018 |
| JP | 3852579 B2 | 11/2006 |

(Continued)

OTHER PUBLICATIONS

International Search Report issued in PCT/JP2017/035283; dated Jan. 9, 2018.

*Primary Examiner* — Sean P Cullen
(74) *Attorney, Agent, or Firm* — Studebaker & Brackett PC

(57) ABSTRACT

[Problem] Provided is a silicon oxide-based negative electrode material capable of avoiding, as much as possible, decreased battery performance resulting from a heterogeneous distribution of a Li concentration. [Solution] Provided is a powder having an average composition of $SiLi_xO_y$, wherein $0.05<x<y<1.2$ and a mean particle size of 1 μm or more. Further, 10 particles randomly selected from particles of the powder each satisfy $0.8<L1/L2<1.2$ with the standard deviation of L2 being 0.1 or less, L1 being a Li concentration at a depth of 50 nm from an outermost surface of each of the 10 particles, and L2 being a Li concentration at a depth of 400 nm from the outermost surface.

4 Claims, 1 Drawing Sheet

(51) Int. Cl.
*H01M 4/38* (2006.01)
*C01B 33/113* (2006.01)
*H01M 4/36* (2006.01)
*H01M 4/02* (2006.01)

(52) U.S. Cl.
CPC .. *H01M 10/0525* (2013.01); *H01M 2004/027* (2013.01)

(58) Field of Classification Search
USPC .................................................... 429/231.95
See application file for complete search history.

(56) References Cited

FOREIGN PATENT DOCUMENTS

JP          4702510 B2    6/2011
WO    WO-2016009590 A1 *  1/2016   ............ H01M 4/133

\* cited by examiner

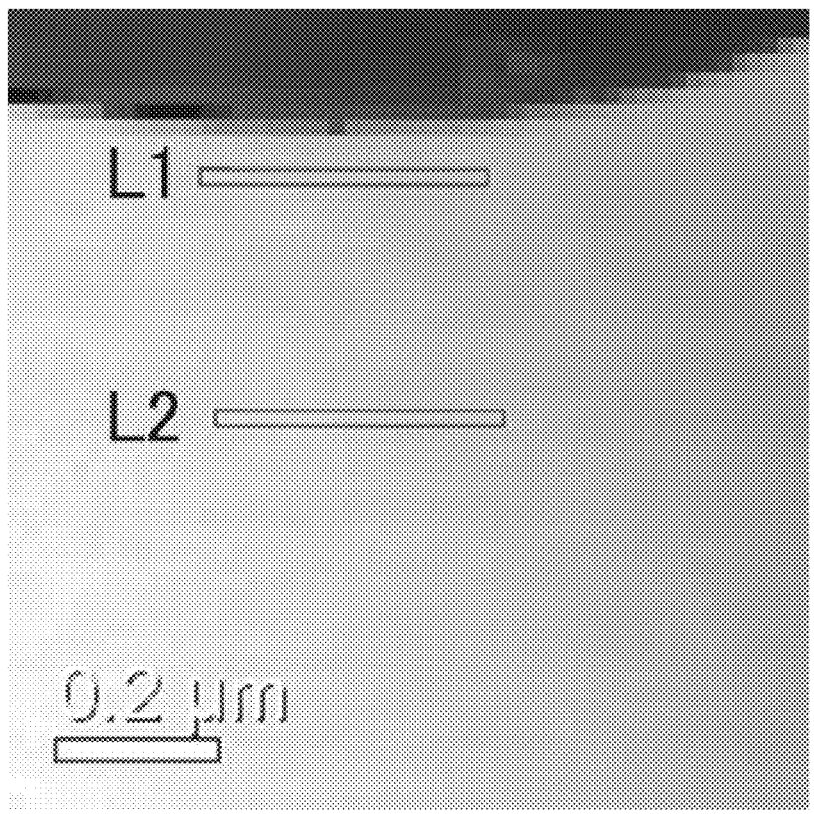

LITHIUM DOPED SILICON OXIDE-BASED NEGATIVE ELECTRODE MATERIAL AND METHOD OF MANUFACTURING THE SAME

TECHNICAL FIELD

The present invention relates to a silicon oxide-based negative electrode material for use in forming a negative electrode of a Li-ion secondary battery and a method of manufacturing the same. More specifically, the present invention relates to a method of manufacturing a silicon oxide-based negative electrode material in which Li is doped to cancel irreversible capacity.

BACKGROUND ART

Silicon oxide ($SiO_x$) is known to be a negative electrode material for a Li-ion secondary battery having a large electric capacity and excellent lifetime properties. Such a silicon oxide-based negative electrode material is processed into a film-like negative electrode by mixing a silicon oxide powder, an electrically conductive auxiliary agent, and a binder to form a slurry, and applying the slurry onto a current collector of a copper foil and the like. The above silicon oxide powder may be obtained by, for example, heating a mixture of silicon dioxide and silicon to generate a silicon-monoxide gas, cooling the silicon-monoxide gas to produce a deposit, and then finely pulverizing the deposit. A silicon oxide powder as manufactured by the above deposition method is known to be largely amorphous, leading to reduced volume change during charge and discharge, which in turn can increase cycle properties.

Nonetheless, such a silicon oxide-based negative electrode material suffers from a characteristically low initial efficiency. This may be evident by a phenomenon in which a Li compound responsible for irreversible capacity that does not contribute to charge and discharge is produced during the initial change, resulting in significantly decreased initial discharge capacity. As an approach of solving this problem, known is a Li-doping method in which Li ions are added to a silicon oxide powder.

For example, Patent Document 1 proposes a solid phase method of heating and calcining a mixture of a silicon oxide powder and a metal Li powder or a mixture of a silicon oxide powder and a Li compound powder under an inert gas atmosphere or under reduced pressure. Further, Patent Document 2 proposes a gas phase method of generating a SiO gas and a Li gas separately, then mixing both gases to produce a gas mixture, and cooling the gas mixture to allow for collection. In either method, the production of a Li compound responsible for irreversible capacity during the initial charge and discharge can be reduced by pre-forming a Li compound responsible for irreversible capacity that does not contribute to charge and discharge. As would be expected, the initial efficiency may be improved. This may be referred to as an "irreversible capacity cancelling process."

However, a silicon oxide-based negative electrode material subjected to the irreversible capacity cancelling process by means of Li doping may compromise battery performance due to heterogeneous Li doping. This is perceived as an issue to be solved.

For example, in the solid phase method (deposition method) as described in Patent Document 1, Li is doped via a reaction at the surface of particles of a powder in which Li ions are doped in particles of a silicon oxide powder through their surfaces during calcination. This tends to result in a heterogeneous distribution of a Li concentration in the inside of particles of the powder, and in particular, tends to result in a higher Li concentration at the surface of the particles. Further, a varied composition of the powder may also be responsible for a heterogeneous distribution of a Li concentration in the inside of particles of the powder, in particular, a heterogeneous distribution of a Li concentration at the surface of the particles.

Meanwhile, in the gas phase method (deposition method) as described in Patent Document 2, homogenous mixing of a SiO gas and a Li gas and control of temperature and partial pressure are very difficult to achieve. This may inevitably result in a heterogeneous distribution of a Li concentration in the gas mixture, and thus a heterogeneous distribution of a Li concentration in the resulting deposit. Further, the deposit will be pulverized to obtain a powder of a negative electrode material. Therefore, the heterogeneous distribution of a Li concentration in the deposit will be responsible for a heterogeneous distribution of a Li concentration among particles of the powder for a negative electrode material.

When a heterogeneous distribution of a Li concentration occurs either in the inside of particles of a powder or among the particles, a highly reactive Li-rich phase such as a LiSi alloy and the like may be formed at a portion having a higher Li concentration. The Li-rich phase, which may react with a binder and a solvent during the aforementioned process of manufacturing an electrode, is responsible for deteriorated battery performance.

CITATION LIST

Patent Document 1: Japanese Patent No. 4702510
Patent Document 2: Japanese Patent No. 3852579

SUMMARY OF INVENTION

Technical Problem

An object of the present invention is to provide a silicon oxide-based negative electrode material capable of avoiding, as much as possible, decreased battery performance resulting from a heterogeneous distribution of a Li concentration, and a method of manufacturing the same.

Solution to Problem

As described above, a significant issue of a silicon oxide-based negative electrode material doped with Li resides in a heterogeneous distribution of a Li concentration in a silicon oxide powder. Moreover, the heterogeneous distribution of a Li concentration in a silicon oxide powder may be represented in terms of a heterogeneous distribution of a Li concentration in particles of the powder and a heterogeneous distribution of a Li concentration among particles of the powder as described above.

The present inventors believed that the case of two different heterogeneous distributions of a Li concentration in a silicon oxide powder, i.e., a heterogeneous distribution of a Li concentration in particles of the powder and a heterogeneous distribution of a Li concentration among particles of the powder, needs to be resolved in order to avoid decreased battery performance resulting from a heterogeneous distribution of a Li concentration. Then the present inventors focused on developing a method of manufacturing a Li-doped silicon oxide powder. Particular attention was paid for a gas phase method (deposition method) such as one described in Patent Document 2.

In a gas phase method (deposition method), a mixture of SiO and Li is manufactured from a SiO gas and a Li gas. The easiest method could include simply mixing a source of a SiO gas with a source of a Li gas to obtain a mixture and heating the mixture. However, a SiO gas and a Li gas will not be generated simultaneously according to this method. Only a Li gas, which has a higher vapor pressure, will be preferentially generated. For this reason, a material in which SiO and Li are homogeneously mixed cannot be obtained.

Another gas phase method (deposition method) could include heating a composite compound of Li and Si represented by lithium silicate such as $Li_2Si_2O_5$ under reduced pressure to generate a SiO gas and a Li gas simultaneously. However, lithium silicate alone will not generate a gas even when heated under reduced pressure. In contrast, it was found that even for such lithium silicate, simultaneous generation of a SiO gas and a Li gas can be achieved when heated under reduced pressure in the co-presence of Si, particularly in the co-presence of elemental Si, leading to the generation of a gas in which SiO and Li are homogeneously mixed. It is also found that the above gas can be deposited to obtain a material in which SiO and Li are homogeneously mixed.

The material in which SiO and Li are homogeneously mixed can be then pulverized to obtain a Li-containing SiO powder. The resulting Li-containing SiO powder can be used to produce a negative electrode material in which a heterogeneous distribution of a Li concentration among particles of the powder and a heterogeneous distribution of a Li concentration in an individual particle of the powder are both resolved. Simultaneous generation of a SiO gas and a Li gas from lithium silicate in the co-presence of elemental Si can likely be explained if lithium silicate is reduced by elemental Si.

The present invention is made based on the above findings. A silicon oxide-based negative electrode material according to an embodiment of the present invention is technologically characterized in that it comprises a powder having an average composition of $SiLi_xO_y$, wherein $0.05<x<y<1.2$ and a mean particle size of 1 µm or more, in which 10 particles randomly selected from particles of the powder each satisfy $0.8<L1/L2<1.2$ with the standard deviation of L2 being 0.1 or less, L1 being a Li concentration at a depth of 50 nm from an outermost surface of each of the 10 particles, and L2 being a Li concentration at a depth of 400 nm from the outermost surface.

In the silicon oxide-based negative electrode material according to an embodiment of the present invention, L1 as a Li concentration at a depth of 50 nm from an outermost surface of each particle means a Li concentration at the surface of a particle, and L2 as a Li concentration at a depth of 400 nm from the outermost surface means a Li concentration in the inside of the particle. The expression "randomly selected 10 particles satisfy $0.8<L1/L2<1.2$" means that the Li concentration is homogeneous from the surface through to the inside of a particle, i.e., the heterogeneous distribution of a Li concentration in a particle is resolved. Further, the expression "the standard deviation of L2 among the 10 particles is 0.1 or less" means that the heterogeneous distribution of a Li concentration among the 10 particles is resolved. Therefore, decreased battery performance resulting from a heterogeneous distribution of a Li concentration can be avoided effectively.

When even one of the randomly selected 10 particles does not satisfy $0.8<L1/L2<1.2$, a Li-rich phase may appear due to the heterogeneous distribution of a Li concentration in a particle, and a powder having low reactivity and high battery performance may not be obtained. When the standard deviation of L2 is greater than 0.1, a Li-rich phase may appear due to a heterogeneous distribution of a Li concentration among particles, and a powder having low reactivity and high battery performance may not be obtained.

For the Li concentrations L1 and L2, the cross-section of a particle of the powder is observed under TEM, and then EELS measurements are performed at a respective predetermined depth for a region of, for example, 20 nm in the longitudinal direction and 400 nm in the transverse direction to obtain a ratio of a Li spectral intensity to a Si spectral intensity, from which the Li concentrations can be relatively determined.

When x is too small in the average composition $SiLi_xO_y$ of a powder, the addition effects of Li cannot be fully obtained. When x is greater than or equal to y, a LiSi alloy may be formed, resulting in increased reactivity of a powder. When y is too large, the charge and discharge capacity of a powder is decreased. For these reasons, the range $0.05<x<y<1.2$ is selected. Each elemental ratio can be measured by the ICP emission spectrometry method and the infrared absorption method.

L2 as a Li concentration in the inside of a particle is defined as a Li concentration at a depth of 400 nm from the outermost surface. If the mean particle size of the particles of the powder is less than 1 µm, L2 may not be able to correctly represent a Li concentration in the inside of the particle and may result in a less reliable value of L1/L2. Therefore, 1 µm or more is selected for the mean particle size of particles of the powder. There is no particular limitation for the upper limit of the mean particle size, but it is preferably 20 µm or less because a larger mean particle size may complicate an application process to an electrode, and further may tend to result in a crack and deteriorated performance due to expansion and contraction during charge and discharge.

A method of manufacturing the silicon oxide-based negative electrode material according to an embodiment of the present invention involves heating a raw material containing Si, O, and Li to generate a SiO gas and a Li gas simultaneously from the raw material; and cooling these gasses on the same surface to allow for collection.

In the method of manufacturing the silicon oxide-based negative electrode material according to an embodiment of the present invention, the SiO gas and the Li gas simultaneously generated are cooled on and collected from the same surface as the SiO gas and the Li gas are simultaneously generated from the raw material. This allows a deposit to be produced in which SiO and Li are homogeneously mixed. After pulverization and powderization of the deposit, a powder can be obtained in which a heterogeneous distribution of a Li concentration among particles of the powder and a heterogeneous distribution of a Li concentration in individual particles are both resolved.

Specifically, the raw material containing Si, O, and Li represents a Si.lithium silicate-containing raw material in which a portion of Si is present as elemental Si, and Li is present as lithium silicate. Use of the above raw material enables simultaneous generation of a SiO gas and a Li gas from lithium silicate by heating that lithium silicate in the co-presence of elemental Si.

The Si.lithium silicate-containing raw material is typically a mixture of elemental Si and lithium silicate or a mixture of elemental Si, lithium silicate, and a Si oxide. The Si oxide is contained for adjusting the O content and the like and may be $SiO_X$ ($0<X\leq 2$) such as SiO and $SiO_2$. Lithium silicate is represented by the general formula $xLi_2O\cdot ySiO_2$, and specifically may be Li$_2$Si$_2$O$_5$ (x=1, y=2), Li$_2$SiO$_3$ (x=1, y=1), Li$_4$SiO$_4$ (x=2, y=1), Li$_6$Si$_2$O$_7$ (x=3, y=2), or the like.

In the raw material containing Si, O, and Li, a material which produces lithium silicate upon heating may be used instead of lithium silicate. Specifically, it may be a material including one or both of LiOH and Li$_2$CO$_3$ and elemental Si, which can be heated and calcined as a primary raw material. When LiOH or Li$_2$CO$_3$ is heated and calcined in the co-presence of elemental Si, lithium silicate is generated while undesired elements are also removed as gas components to yield a Si.lithium silicate-containing raw material including elemental Si and lithium silicate. Heating the above Si.lithium silicate-containing raw material as a secondary raw material will generate a SiO gas and a Li gas simultaneously. In addition, a material including Li$_2$O, elemental Si, and a Si oxide (SiO$_X$; 0<X≤2); a material including an organic lithium compound and the like instead of Li$_2$CO$_3$; and the like may be used as a primary material. However, a material including one or both of LiOH and Li$_2$CO$_3$ in addition to elemental Si is particularly preferred in view of cost and easy handling of a raw material. The primary raw material may also include a Si oxide (SiO$_X$; 0<X≤2) for adjusting the O content and the like in a similar manner as the secondary raw material, i.e., the above Si.lithium silicate-containing raw material.

Here, a reaction for forming lithium silicate may be performed immediately before a reaction for simultaneously generating a SiO gas and a Li gas. That is, a secondary raw material may be heated continuously after the primary raw material is heated and calcined to form the secondary raw material in the same reaction vessel. Alternatively, the primary raw material may be heated and calcined in advance to form a secondary raw material. When the primary raw material is heated and calcined under reduced pressure, impurity elements may be more easily separated. When the primary raw material is heated and calcined in advance, heating and calcination is preferably performed under an inert gas atmosphere or under reduced pressure.

The average composition of a raw material containing Si, O, and Li may be expressed by SiLi$_x$O$_y$, in which 0.05<x<y<1.2 is preferred, and in particular, 0.05<x<0.7 is preferred for x, and 0.9<y<1.1 is preferred for y. The contents of Li, Si, and O in the raw material are adjusted within these ranges so as to obtain a desired element ratio.

When x is too small, the addition effects of Li may not fully be obtained. On the other hand, a larger value of x may increase the yield of a Li gas, resulting in the formation of a highly reactive Li-rich phase. When a value of y is too small or too large, the raw material may leave an increased amount of residue, and in addition, a larger amount of a Li gas may be generated due to an altered composition ratio of Li, resulting in the formation of a Li-rich phase.

A material (deposit) collected after cooling on the same surface may be processed, i.e., pulverized so as to have a predetermined particle size to obtain a powder for a negative electrode material. There is no particular limitation for a method of pulverization, but a method is preferred in which necessary measures are taken to prevent contamination of metal impurities, and specifically a method is preferred in which a non-metal material such as ceramic is used for a portion to be in contact with a powder.

For a powder of a negative electrode material, the surface of a particle of the powder may be partially or entirely coated with an electrically conductive carbon film. The coating of an electrically conductive carbon film can reduce surface resistance and improve battery properties. The electrically conductive carbon film for use herein may be obtained by, for example, a thermal CVD reaction with a hydrocarbon gas. However, there is no particular limitation for a method of achieving this.

Advantageous Effects of Invention

The silicon oxide-based negative electrode material according to an embodiment of the present invention can effectively avoid decreased battery performance due to a heterogeneous distribution of a Li concentration by resolving a heterogeneous distribution of a Li concentration in particles of a powder for a negative electrode material and a heterogeneous distribution of a Li concentration among particles of the powder. This can significantly improve battery performance.

Further, the method of manufacturing the silicon oxide-based negative electrode material according to an embodiment of the present invention can produce a powder for a negative electrode material in which a heterogeneous distribution of a Li concentration in particles of the powder and a heterogeneous distribution of a Li concentration among particles of the powder are both resolved, and thus can effectively avoid decreased battery performance due to a heterogeneous distribution of a Li concentration. This can significantly improve battery performance.

BRIEF DESCRIPTION OF DRAWINGS

The FIGURE shows an image of a cross-section of a particle of a powder observed under a TEM, the powder pertaining to the silicon oxide-based negative electrode material according to an embodiment of the present invention.

DESCRIPTION OF EMBODIMENT

Below, the embodiments of the present invention will be described. The silicon oxide-based negative electrode material according to an embodiment of the present invention may typically be manufactured by the following methods.

First, a Si powder is mixed with, for example, a Li$_2$Si$_2$O$_5$ powder as a lithium-silicate powder to prepare a raw material containing Si, O, and Li. A SiO$_2$ powder is mixed to adjust the O content if necessary. The mixing ratio of the powders is adjusted so as to obtain the desired element ratio (Li:Si:O) of Li, Si, and O (for example, 1:0.4:1) within a range where the average composition SiLi$_x$O$_y$ of the powder mixture satisfies 0.05<x<y<1.2.

Next, the above powder mixture as a raw material is changed into a reaction vessel, and heated under reduced pressure to generate a gas from, in particular, lithium silicate contained in the mixed raw material. In the above gas-generating reaction, a SiO gas and a Li gas are generated simultaneously. With reference to chemical formulae, the reaction may be expressed generally by formula (1), or by formula (2) when lithium silicate is Li$_2$Si$_2$O$_5$. As described above, lithium silicate may be represented by the general formula of $_x$Li$_2$O.$_y$SiO$_2$.

[Formulae 1]

As shown in formula (1) and formula (2), a SiO gas and a Li gas are generated simultaneously from lithium silicate by heating in the co-presence of elemental Si. This reaction is believed to be a reductive reaction by Si.

While allowing the gases to be generated from the raw material in the reaction vessel, the generated gases are cooled and deposited on a surface of a vapor deposition platform arranged at an upper portion within the reaction vessel. After the end of the reaction, a deposit is collected from the surface of the vapor deposition platform. The collected deposit, which is a Li-containing silicon oxide material, is pulverized to obtain a powder for a negative electrode material having a predetermined particle size.

The SiO gas and the Li gas are simultaneously generated from the raw material within the reaction vessel. This allows for the production of a gas mixture of the two having their concentrations homogeneously distributed. Therefore, a deposit obtained by cooling the above gas mixture on the same surface of a vapor deposition platform will also have homogeneously distributed concentrations. Therefore, a powder obtained by pulverizing the above deposit will have both a homogeneous distribution of a Li concentration among particles of the powder and a homogeneous distribution of a Li concentration in individual particles of the powder. When the above powder is used as a powder for a negative electrode material, development of a Li-rich phase can be prevented, leading to decreased reactivity and improved battery performance.

In another embodiment, a Si powder is mixed with a LiOH powder. A $SiO_2$ powder is mixed to adjust the O content if necessary. The resulting powder mixture as a primary raw material is changed into a reaction vessel and heated and calcined under an Ar atmosphere. With reference to chemical formulae, a reaction in which LiOH is heated in the co-presence of elemental Si may be expressed by the first part of formula (3).

[Formulae 2]

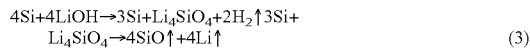

$$4Si+4LiOH \rightarrow 3Si+Li_4SiO_4+2H_2 \uparrow 3Si+ Li_4SiO_4 \rightarrow 4SiO \uparrow +4Li \uparrow \qquad (3)$$

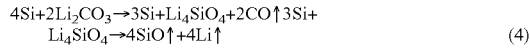

$$4Si+2Li_2CO_3 \rightarrow 3Si+Li_4SiO_4+2CO \uparrow 3Si+ Li_4SiO_4 \rightarrow 4SiO \uparrow +4Li \uparrow \qquad (4)$$

As shown in the first part of formula (3), heating and calcining LiOH in the co-presence of elemental Si generates lithium silicate ($Li_4SiO_4$) while an undesired element H is removed as a gas component. The resulting calcined material is a mixture of lithium silicate ($Li_4SiO4$) and residual element Si. This corresponds to the raw material containing Si, O, and Li used in the aforementioned embodiment.

Then, heating of the resulting calcined material as a secondary raw material is continued under reduced pressure. Heating of lithium silicate ($Li_4SiO_4$) contained in the secondary raw material in the co-presence of elemental Si then generates a Si gas and a Li gas simultaneously from that lithium silicate ($Li_4SiO_4$) as shown in the latter part of formula (3). Here, the generated gases can be cooled on and collected from the same surface to obtain a powder for a negative electrode material having a homogeneous distribution of a Li concentration as in the aforementioned embodiment. Instead of continuously heating the secondary raw material, the secondary raw material may be subsequently reheated.

As described above, a raw material including elemental Si and lithium silicate (a Si.lithium silicate-containing raw material) can be obtained by heating and calcining a primary raw material including elemental Si and LiOH. The resulting raw material obtained as a secondary raw material can be heated to generate a SiO gas and a Li gas simultaneously. $Li_2CO_3$ may also be used instead of LiOH. That is, a Si powder is mixed with a $Li_2CO_3$ powder. A $SiO_2$ powder is mixed to adjust the O content if necessary. The resulting powder mixture as a primary raw material is changed into a reaction vessel and heated and calcined under an Ar atmosphere. With reference to chemical formulae, a reaction in which $Li_2CO_3$ is heated in the co-presence of elemental Si may be expressed by the first part of formula (4).

As shown in the first part of formula (4), heating and calcining $Li_2CO_3$ in the co-presence of elemental Si generates lithium silicate ($Li_4SiO_4$) while an undesired element C is removed as a gas component. The resulting calcined material is a mixture of lithium silicate ($Li_4SiO_4$) and residual element Si. This corresponds to the raw material containing Si, O, and Li used in the aforementioned embodiment.

Then, heating of the resulting calcined material as a secondary raw material is continued under reduced pressure. Heating of lithium silicate ($Li_4SiO_4$) contained in the secondary raw material in the co-presence of elemental Si then generates a Si gas and a Li gas simultaneously from that lithium silicate ($Li_4SiO_4$) as shown in the latter part of formula (4). Here, the generated gases can be cooled on and collected from the same surface to obtain a powder for a negative electrode material having a homogeneous distribution of a Li concentration as in the aforementioned embodiment. Instead of continuously heating the secondary raw material, the secondary raw material may be subsequently reheated.

As described above, a raw material including elemental Si and lithium silicate (a Si.lithium silicate-containing raw material) can be obtained by heating and calcining a primary raw material including elemental Si and $Li_2CO_3$. The resulting raw material as a secondary raw material can be heated to generate a SiO gas and a Li gas simultaneously. LiOH and $Li_2CO_3$ may also be used instead of using LiOH or $Li_2CO_3$.

It is noted that the chemical reactions in the embodiments are represented by chemical formulae (1) to (4), but these merely represent putative reactions in model cases in which these phenomena are simplified. The actual reactions may likely be more complicated due to the addition of $SiO_2$ for adjusting the O content.

Example 1

A Si powder, a $SiO_2$ powder, and a $Li_2Si_2O_5$ powder were mixed in a molar ratio of 21:15:2. The element ratio of the powder mixture is Si:Li:O=1:0.1:1. This powder as a raw material was charged into a reaction vessel and heated to 1400° C. under reduced pressure. Generated gases were cooled on and collected from a vapor deposition platform arranged at an upper portion within the reaction vessel. Then, the collected material (deposit) was pulverized into a powder with a ball mill using a zirconia container and balls. The mean particle size of the powder was 5.2 μm as determined by the laser diffraction particle size distribution measurement.

From the resulting powder, 10 particles were randomly selected for the cross-sectional TEM observation of each particle. EELS measurements were performed at a depth of 50 nm from the outmost surface of a particle for a region of 20 nm in the longitudinal direction and 400 nm in the transverse direction to obtain a Si spectral intensity and a Li spectral intensity. The ratio of the Li spectral intensity to the Si spectral intensity was taken as L1, i.e., a Li concentration at the surface of the particle. A similar procedure was performed at a depth of 400 nm from the outmost surface of the particle to obtain the ratio of a Li spectral intensity to a Si spectral intensity, which was taken as L2, i.e., a Li concentration in the inside of the particle. L1/L2 was determined for each of the 10 particles, and the standard deviation of L2 was then determined.

For the measurements of a particle, the particle was cut to expose a cross-section under an inert atmosphere by the FIB process using an FB-2000A (Hitachi). The TEM observation was performed under an atomic resolution-analytical electron microscope JEM-ARM 200F (JEOL), and then EELS measurements were performed with a GATAN GIF Quantum energy filter. The TEM measurements were performed under the following conditions: the acceleration voltage was 200 kV; the diameter of a beam was 0.2 nmφ; and the energy resolution was 0.5 eV FWHM.

Further, the Li content (Li/Si) and the O content (O/Si) of the powder obtained were measured by the ICP emission analysis method and the infrared absorption method.

Example 2

A Si powder and a $Li_2Si_2O_5$ powder were mixed in a molar ratio of 3:1. The element ratio of the powder mixture is Si:Li:O=1:0.4:1. Other procedures were the same as Example 1, and a powder with an average particle size of 5.4 µm was produced. Then, L1/L2 and the standard deviation of L2 of the resulting powder were determined as well as the Li content and the O content. The FIGURE shows a cross-sectional TEM image of a particle of the powder which was used for measuring L1 and L2 of that particle.

Example 3

A Si powder and a $Li_2SiO_3$ powder were mixed in a molar ratio of 2:1. The element ratio of the powder mixture is Si:Li:O=1:0.67:1. Other procedures were the same as Example 1, and a powder with an average particle size of 5.1 µm was produced. Then, L1/L2 and the standard deviation of L2 of the resulting powder were determined as well as the Li content and the O content.

Example 4

A Si powder, a $SiO_2$ powder, and a LiOH powder were mixed in a molar ratio of 4:1:3. The resulting powder as a primary raw material was charged into a reactional vessel and heated and calcined to 1400° C. under an Ar atmosphere at the atmospheric pressure. A portion of the calcined material was collected and analyzed. The element ratio was found to be Si:Li:O=1:0.6:1, and no residual H component was found.

Then, the calcined material was used as a secondary raw material, and allowed to be continuously heated at 1400° C. in the same reaction vessel under reduced pressure. Generated gases were then cooled on and collected from a vapor deposition platform arranged at an upper portion within the reaction vessel. Subsequently, the collected material (deposit) was subjected to powderization as in Example 1, and then L1/L2 and the standard deviation of L2 of the powder were determined as well as the Li content and the O content. The mean particle size of the resulting powder was 5.6 µm.

Comparative Example 1

A Si powder and a $SiO_2$ powder were mixed in a molar ratio of 1:1. The element ratio of the powder mixture is Si:Li:O=1:0:1. Other procedures were the same as Example 1, and a powder with an average particle size of 5.1 µm was produced. The resulting powder did not contain Li, and thus only the O content was measured.

Comparative Example 2

A powder of lithium hydride (LiH) was added to the powder produced in Comparative Example 1, i.e., a SiO powder so that Li was present at 0.4 mol relative to Si and O, and then the resulting powder was heated and calcined to 850° C. under an Ar atmosphere to obtain a powder with a mean particle size of 5.2 µm. Then, L1/L2 and the standard deviation of L2 of the resulting powder were determined as well as the Li content and the O content.

Comparative Example 3

Two reactional vessels were provided. A mixture in which a Si powder and a $SiO_2$ powder were mixed in a molar ratio of 1:1 was charged into one vessel. The element ratio of the powder mixture is Si:Li:O=1:0:1. Further, metal Li was charged into the other vessel under an inert gas atmosphere. Then, the weight ratio and the heating temperature of the raw materials in the two vessels were adjusted so that a SiO gas generated in one vessel and a Li gas generated in the other vessel showed a partial pressure of 1:0.4. The gases generated in both vessels were mixed and cooled on and collected from the common vapor deposition platform.

Subsequently, the collected material (deposit) was subjected to powderization as in Example 1, and L1/L2 and the standard deviation of L2 of the resulting powder were determined as well as the Li content and the O content. The mean particle size of the resulting powder was 5.2 µm.

Battery Evaluation

Battery evaluation was performed according to the following procedure for the powder samples produced in Examples 1 to 4 and Comparative Examples 1 to 3.

A powder sample, a PI binder as a nonaqueous (organic) binder, and a KB as an electrically conductive auxiliary agent were mixed in a weight ratio of 80:15:5 and kneaded with an organic solvent NMP to obtain a slurry. The resulting slurry was applied onto a copper foil and subjected to vacuum heat treatment at 350° C. for 30 minutes to obtain a negative electrode. The resulting negative electrode, a counter electrode (a Li foil), an electrolytic solution (EC: DEC=1:1), an electrolyte (1 mol/L of LiPF), and a separator (a polyethylene porous film with a film thickness of 30 µm) were combined to fabricate a coin cell battery.

The resulting coin cell battery was subjected to a charge and discharge test. Charge was performed at a constant current of 0.1 C until the voltage across the two electrodes of the battery reached 0.005 v. After the voltage reached 0.005 v, constant-potential charge was then performed until the electric current reached 0.01 C. Discharge was performed at a constant current of 0.1 C until the voltage across the two electrodes of the battery reached 1.5 V.

The initial charging capacity and initial discharge capacity were measured by this charge and discharge test to determine the initial efficiency. Results are shown in Table 1 along with the main specifications (the Li content, the O content, L1/L2, and the standard deviation of L2) of powder samples.

TABLE 1

| | Raw Material Li/Si | Post-rxn Li/Si | Post-rxn O/Si | L1/L2 | L2 Std. Dev. | Initial efficiency |
|---|---|---|---|---|---|---|
| Example 1 | 0.1 | 0.08 | 1.03 | 0.94-1.03 | 0.05 | 74.30% |
| Example 2 | 0.4 | 0.41 | 0.99 | 0.95-1.06 | 0.04 | 79.10% |
| Example 3 | 0.67 | 0.95 | 1.05 | 0.91-1.05 | 0.05 | 82.50% |
| Example 4 | 0.6 | 0.93 | 1.02 | 0.88-1.15 | 0.07 | 82.20% |
| Comp. Exp. 1 | 0 | 0 | 1.04 | — | — | 71.40% |
| Comp. Exp. 2 | 0 | 0.4 | 1.08 | 1.19-1.57 | 0.13 | 68.60% |
| Comp. Exp. 3 | 0.4 | 0.34 | 0.98 | 0.90-1.11 | 0.16 | 29.70% |

In Comparative Example 1, Li was not doped to a SiO powder. As compared with this, the initial efficiency was improved for all of Examples 1 to 4, demonstrating that the performance was improved by Li doping. Incidentally, L1/L2 as a ratio of a Li concentration in the inside of a particle to a Li concentration at the surface of the particle falls within a range of 0.8<L1/L2<1.2, and the standard deviation of L2 is also 0.1 or less for all cases.

In contrast, in Comparative Example 2, Li was doped in accordance with the solid phase method (calcination method) as described in Patent Document 1. As often observed in this method, Li in a higher concentration was unevenly distributed at the surface of a particle, and L1/L2 as a ratio of a Li concentration in the inside of a particle to a Li concentration at the surface of the particle showed significant variation toward a value of greater than 1.2. This resulted in deteriorated binder performance and a decreased initial efficiency as compared with even Comparative Example 1.

In contrast, in Comparative Example 3, Li was doped in accordance with the gas phase method (deposition method) as described in Patent Document 2. Use of a gas mixture of a SiO gas and a Li gas allowed for a smaller difference in the Li concentration between the surface of a particle and the inside of the particle, but the Li concentration showed significant variation among particles, resulting in an even lower initial efficiency as compared with Comparative Example 2. This is likely because particles with higher Li concentrations were produced, and they reacted with a binder.

Incidentally, the Li content (x=Li/Si) and the O content (y=O/Si) in a powder satisfies 0.05<x<y<1.2 as defined in the present invention for all samples except for Comparative Example 1 where Li was not doped. This also indicates that L1/L2 and the standard deviation of L2 are effective performance measures for a powder of a negative electrode material.

The invention claimed is:

1. A method of manufacturing a silicon oxide-based negative electrode material, the method comprising: heating a raw material containing Si, O, and Li to generate a SiO gas and a Li gas simultaneously from the raw material, and cooling the SiO gas and the Li gas on a same surface to allow for collection,
   wherein a portion of Si contained in the raw material is present as elemental Si, and Li is present as lithium silicate.

2. The method of manufacturing a silicon oxide-based negative electrode material according to claim 1,
   wherein an average composition of the raw material is represented by $SiLi_xO_y$ wherein 0.05<x<0.7 and 0.9<y<1.1.

3. The method of manufacturing a silicon oxide-based negative electrode material according to claim 1,
   wherein the raw material is a mixture of the elemental Si and the lithium silicate, or a mixture of the elemental Si, the lithium silicate, and a Si oxide.

4. The method of manufacturing a silicon oxide-based negative electrode material according to claim 3, comprising:
   heating and calcining a primary raw material including one or both of LiOH and $Li_2CO_3$ in addition to the elemental Si to obtain a secondary raw material, and heating the secondary raw material as the raw material.

* * * * *